Oct. 25, 1938.　　　G. A. LYON　　　2,134,464
TIRE COVER
Filed March 7, 1936　　　3 Sheets-Sheet 1
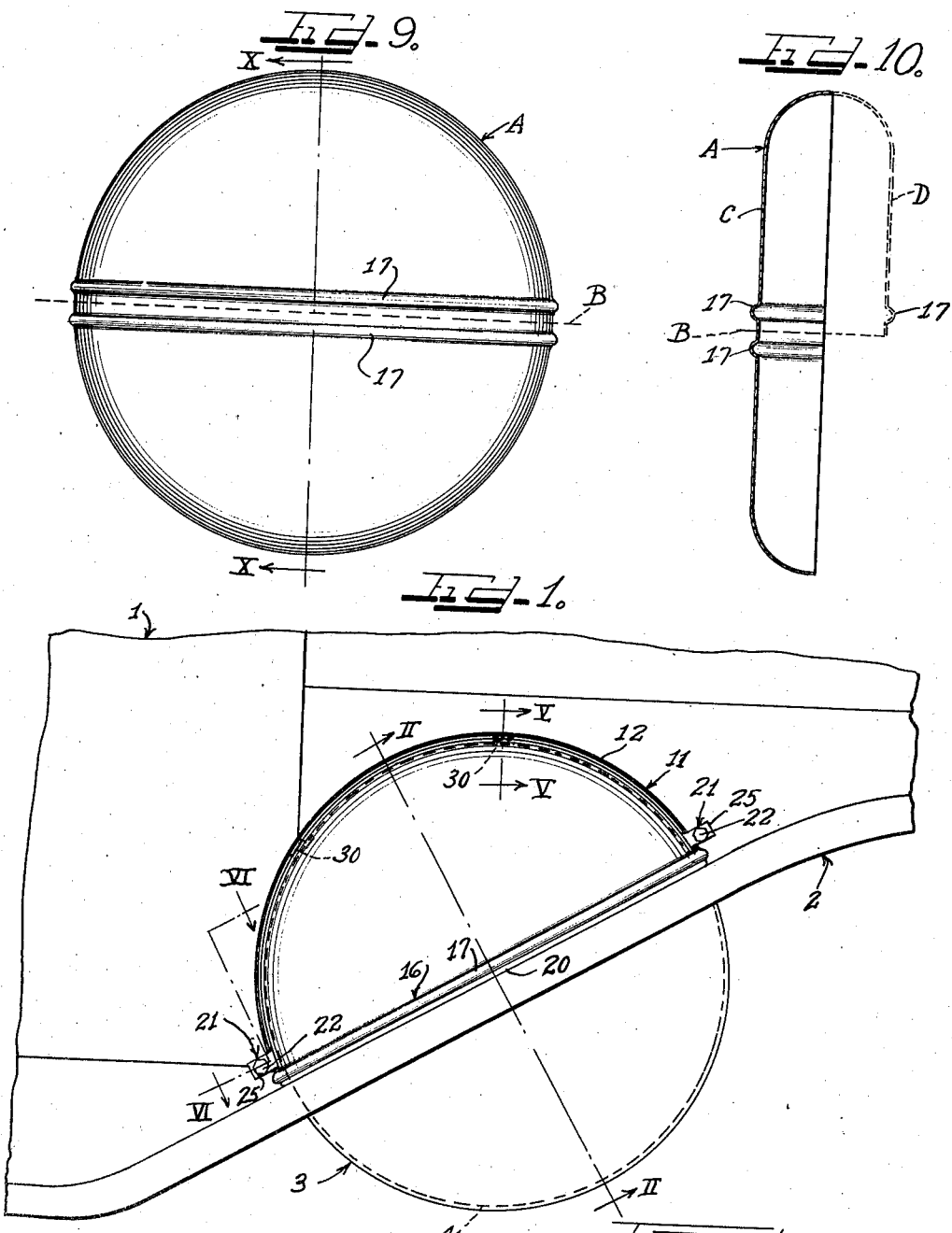
Inventor
George Albert Lyon.
by Charles Hill
Attys.

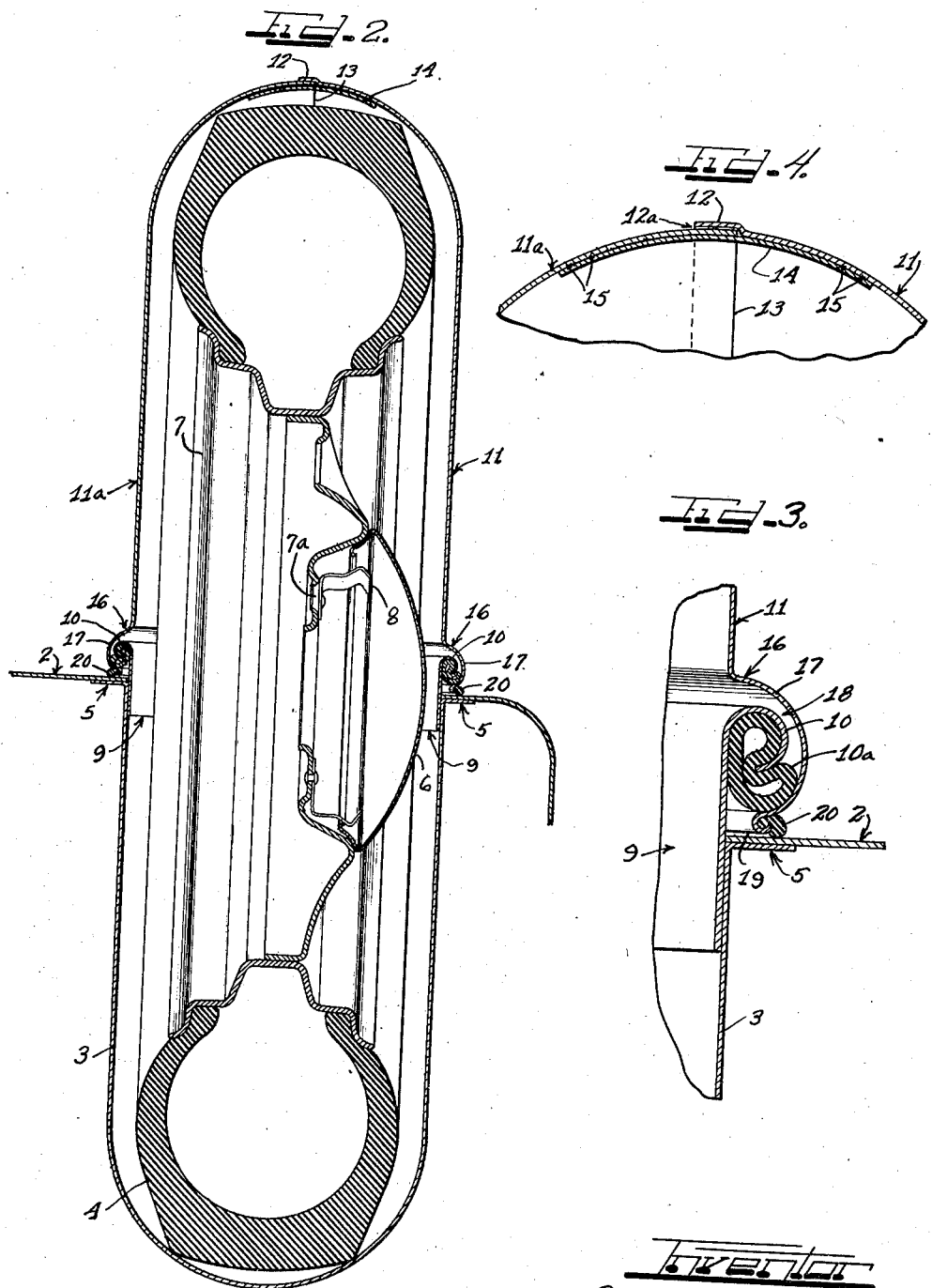

Oct. 25, 1938.  G. A. LYON  2,134,464
TIRE COVER
Filed March 7, 1936  3 Sheets-Sheet 3
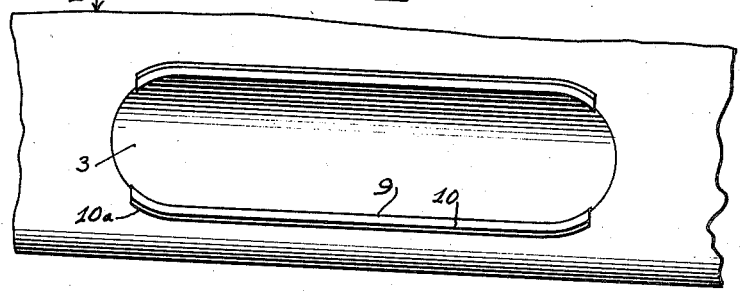
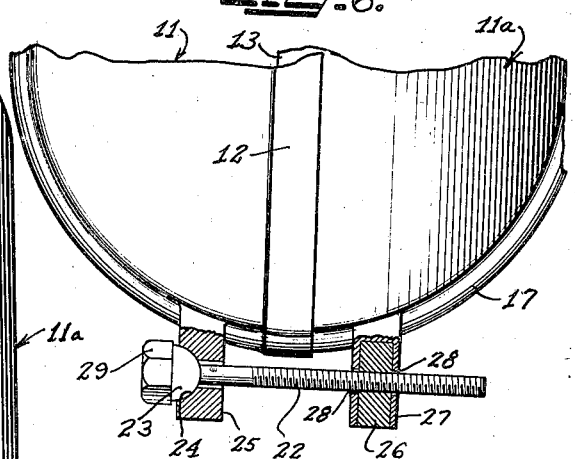
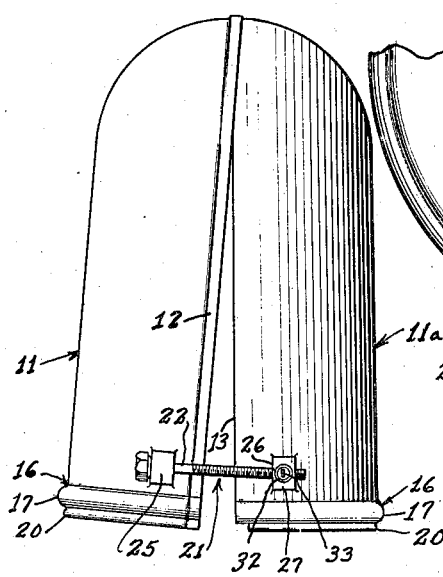
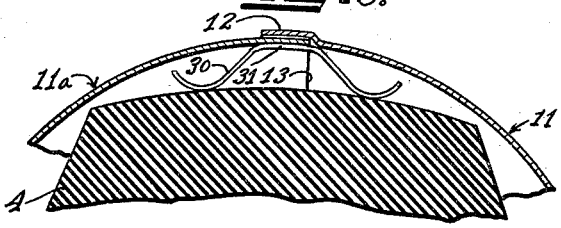
Inventor
George Albert Lyon.
by Charles...
Attys.

Patented Oct. 25, 1938

2,134,464

UNITED STATES PATENT OFFICE 2,134,464

TIRE COVER

George Albert Lyon, Detroit, Mich., assignor to Lyon Incorporated, Detroit, Mich., a corporation of Delaware Application March 7, 1936, Serial No. 67,655

3 Claims. (Cl. 224—29)

This invention has to do with tire covers and is concerned more particularly with an improved tire cover construction and an improved method of making the same.

It is an object of the invention to provide an improved tire cover construction for a spare tire mounted in an automobile fender well or other automobile spare tire receptacle.

It is an object of the invention to provide a clam shell type of cover which may be shoved down over the part of a spare tire exposed above a well and thereafter clamped into proper tire protecting position.

It is a further object of the invention to provide a unitary, multi-part tire cover construction of the clam shell type adapted to cooperate with the fender well at the mouth thereof in substantially enclosing the exposed part of the spare wheel and tire.

It is also an object of the invention to provide a cover for cooperation with a fender well for a spare tire, the construction being such that the cover may be of an extent not substantially exceeding 180° and yet being provided with means for firmly holding the same connected with the fender to shield the otherwise exposed part of the spare wheel and tire.

Another object of the invention involves the provision of a clam shell type of cover embodying resilient means for urging the parts toward each other and thus into proper cooperative relation with the spare tire.

Another object of the invention involves the provision of a multi-part tire cover construction wherein the parts are flexibly hinged together.

It is also an object of the invention to provide a tire cover of the class described in cooperation with a fender well, with means for preventing rattling between the parts.

Another object of the invention involves an improved method of making a tire cover hood for substantially enclosing the part of a spare tire and wheel normally projecting clear of a well, such as a fender well.

In accordance with the general features of the invention, a piece of sheet material such as sheet metal is blanked or stamped out into the shape of a shallow dish. This piece is then cut substantially diametrically to form two substantially identical halves of generally semi-circular shape. These halves are placed in juxtaposition to each other with the substantially semi-circular edges lapped somewhat and with the inner side walls facing each other. A spring or other suitable flexible strap is secured to the rim portions of the members in a position bridging the lapped margins, preferably at a point substantially spaced from the ends of the semi-circles, imparting to the complete structure the shape and operation which justifies the descriptive term "clam shell". Should the requirements call for a clam shell type of cover of a peripheral extent in excess of 180°, it is necessary to form the dished member with one axis longer than the other and to cut the member along the shorter axis. Or, if it is desired to construct a cover in accordance with the present invention so that the cover is less than 180° in extent, the periphery of the member may have the appearance of two arcs preferably of equal extent and each less than 180° in extent. In the formation of a cover in the latter case, the member would be severed along the line joining the meeting ends of such arcs to provide identical shell portions as explained above.

Further, in accordance with the invention, a fender or other suitable part of the vehicle may be provided with a well for receiving the spare tire and preferably projecting upward from the well is supporting means for a beading of rubber or the like. Each of the clam shell members is provided with anti-rattling beading adapted to engage the fender adjacent the well. Each of the members, moreover, is formed to be clamped over the beading supported by the well so as to interlock the cover with the well and firmly support the cover in place. When it is desired to remove the cover, the members may be unclamped and swung away from each other sufficiently to enable the free edges thereof to be released from the beading supported by the well, and then the cover may be lifted off.

Suitable adjusting means arranged preferably at the end portions of the tread covering part of the cover are employed to adjust the shells toward and away from each other and provide the means for clamping the cover in interlocked relation to the means projecting from the well. This clamping means may be held in position by a suitable key-operated or other secret locking mechanism.

Provision is made in the tire cover construction to hold the spare tire against rattling and to accommodate tires of different widths and diameters.

The method embodying the invention is quite simple, since with a series of simple operations which may be performed quickly and at low cost, a cover of the clam shell type may be constructed. Moreover, the cover is extremely simple, involving a minimum of parts and being capable of being applied and removed expeditiously and, when applied, is held rigidly in place against rattling.

Other objects and advantages of the invention will appear as the description proceeds.

This invention in a preferred form is illustrated in the drawings and hereinafter more fully described.

On the drawings:

Figure 1 is a fragmentary elevational view showing a cover constructed in accordance with the invention applied in spare tire covering cooperation with a fender well in a front right fender of an automobile.

Figure 2 is an enlarged fragmentary sectional view taken substantially in the plane designated by the line II—II in Figure 1.

Figure 3 is an enlarged fragmentary sectional view of the cooperating beading structure shown in reduced size in Figure 2.

Figure 4 is an enlarged fragmentary sectional view of the flexible hinge structure appearing at the upper part of Figure 2.

Figure 5 is an enlarged fragmentary sectional view taken substantially as indicated by the line V—V in Figure 1.

Figure 6 is an enlarged view, partly in section and partly in plan, taken as indicated by the broken line VI—VI in Figure 1.

Figure 7 is a front end elevation, somewhat enlarged, of the cover structure shown in Figure 1, but with the cover shell members adjusted apart.

Figure 8 is a fragmentary plan view of the fender and well construction for cooperation with the cover embodying the invention.

Figure 9 is an outer side elevation of a dished plate formed at one stage of the process of making a clam shell cover embodying the invention.

Figure 10 is a vertical sectional view taken substantially as designated by the line X—X in Figure 9, and showing in double dotted lines the relative position in which the lower half, after being severed as shown by the single dotted line, is placed at a later stage in the formation of the clam shell cover structure.

Referring now more particularly to the drawings, the automobile designated generally at 1 has its front fender 2 provided with a spare tire well 3 for receiving a spare tire 4. The well 3 may be integral with the fender 2 or may be welded or otherwise suitably secured as at 5. The depth of the well 3 may be such as to receive half or more or less than half of the spare tire, and preferably of sufficient width to leave clearance between the well and the side walls of the tire, and also between the well and a hub cap 6 applied to the spare tire carrying wheel 7, by means of hub cap supporting springs 8 or the like.

In accordance with the invention, the well 3 is equipped with strips 9 extending upwardly from the mouth of the well and preferably secured to the well as by spot welding, riveting, or by any other suitable means. Each of the strips 9 has its outer margin 10 flanged outwardly and clinched to a rubber or the like cushioning bead strip 10a, terminating somewhat above the fender 2 as clearly seen in Figures 2 and 3. The purpose for this beading construction is to provide antirattling retaining or anchoring means for a cover embodying the invention and adapted to protect the part of the spare wheel and tire projecting upwardly from the well, as will appear hereinafter.

The invention involves the provision of a removable cover for the spare tire carried in the well. While the cover may assume various forms, it is deemed sufficient for the present purpose to illustrate and describe one form. In this form, there is provided a pair of members each of which is shaped to extend transversely across substantially half the tread of the tire and each of which has a side portion shaped to cover the portion of the side of the wheel and tire projecting out of a well such as a fender well. These members are substantially identical with each other, one serving for covering the outer side portions of the wheel and tire and the other cover member serving for disposition between the vehicle body, such as the engine hood, and the adjacent rear or inner side portions of the spare wheel and tire. In the illustrated embodiment of the invention, the two cover members are arranged in overlapped relation at the edges of the tread covering portions thereof. For the purposes herein, the cover member with its edge on the outside of the edge of the other cover member will be termed the "outer cover member," and the other cover member will be termed the "inner cover member." The outer cover member 11 is substantially identical with the inner cover member 11a, differing therefrom substantially only in the provision of a radially outwardly offset margin 12, the extent of radial offsetting being determined by the thickness of the material so that the cooperating edge 13 of the inner cover member 11a, when fitted within the offset flange 12, will be in substantial continuation with the normal portion of the other cover member 11. When the edge 13 of the inner cover member 11a is disposed throughout within the offset portion 12 of the outer member 11, the cover structure is preferably substantially symmetrical with respect to the median plane of a tire when disposed thereover.

While any suitable means may be employed for holding the cover members 11 and 11a in assembled relation, it is preferred that they be permanently connected substantially midway of the ends of their peripheries by a hinge structure to enable the parts 11 and 11a to be associated in a manner similar to clam shells. In accordance with the present invention, this result is preferably obtained by the employment of a spring or other flexible strap 14 extending transversely within and across the median plane of the cover structure as shown in Figures 2 and 4. This strap is united permanently to both cover members 11 and 11a as by spot welding 15, riveting, or any other suitable means, the portion of the strap 14 between its connected ends being unconnected with respect to the cover parts 11 and 11a. Except for the strap 14, the parts 11 and 11a are unconnected, so that the strap 14 may afford a spring hinge connection between the cover parts, acting in such a way as normally to either separate or draw the cover parts toward each other to position the entire edge 13 within the marginal flange 12, but yieldable to permit hinging of the parts 11 and 11a relative to each other about an axis substantially tangent to the lapped margins of the cover parts at the strap 14, such axis being substantially parallel to the median plane of the cover. In order that the hinging movement of the members 11 and 11a may be effected without interference, a slight amount of clearance at 12a is provided between the marginal flange 12 and the portion of the cover member 11a fitting therein. This clearance need only be slight, however, since in accordance with the invention as will appear hereinafter only a slight amount of separation of the free ends of the members 11 and 11a will be found necessary.

While the width of cover structure, when the parts 11 and 11a are together, is substantially the same as that of the well 3, it is to be appreciated that the width of the cover structure may be varied as desired. The width should be such as to properly accommodate tires of various widths for the same nominal size wheel and also to accommodate such cap 6 as may be carried by the wheel. The depth of the cover structure also should be such as to accommodate tires of different diameters.

The free marginal portion 16 of each of the cover parts 11 and 11a is bulged outwardly at 17 to provide an ornamental and reinforcing bead and also to provide an elongated recess 18, for receiving the bead structure 10 and 10a associated with the well 3. The margin 16 terminates in an outwardly curved edge 19 to which is clinched an anti-rattling rubber or other cushion bead 20 projecting downwardly therefrom and adapted to engage the upper surface of the fender 2 and thereby prevent metal to metal contact between the cover members 11 and 11a and the fender 2. The bead 10a carried by the fender structure projects laterally normally to such an extent that when it is in contact with the inner wall of the bead 17 at each side of the cover structure, the cover structure is not completely closed.

The closing of the cover structure is effected by any suitable means, such as the clamping means designated generally at 21. While the clamping means may take any suitable form, the means illustrated comprises a bolt 22 having a substantially spherical shoulder 23 swivelly engaged with corresponding bearing surface 24 in a bracket 25 carried by the outer cover member 11. The bracket 25 may be riveted, welded, or otherwise suitably secured to the cover member 11. The shank of the bolt 22 is threaded and extends through a nut 26 swivelled in a bracket 27 carried by the inner cover member 11a in juxtaposition to the bracket 25. The bracket 27 may be riveted, welded, or otherwise suitably secured to the cover member 11a. The swivel nut 26 may be of any suitable construction and may conveniently take the form of a cylinder tapped diametrically to receive the threaded shank of the bolt 22 and received in a cylindrical opening in the bracket 27, the latter being slotted at 28 to permit passage therethrough of the shank of the bolt 22 and also to permit such shank to move relative to the bracket 27 through an angle determined by the angle of separation of the parts 11 and 11a.

The clamping means is shown in Figure 6 to be in such a condition as to hold the cover structure closed. When the cover structure is in this condition and is mounted in proper cooperative relation to the spare tire and wheel, the edges 19 of the cover structure are disposed between the beading 10a and the fender 2, as shown in Figures 2 and 3, and the beading 10a is compressed toward the median plane of the well. This compression tends to prevent rattling of the cover structure relative to the well, but it is to be appreciated that in no event does the beading 10a become so compressed as to allow engagement between the cover and the strap 9 projecting from the well 3. Tightening of the clamping means also results in a wedging of the edge portion 19 of each cover part and the associated beading 20 between the beading 10a and the fender 2, both beading elements being thus placed under pressure and thus preventing any rattling whatever.

When it is desired to remove the cover structure, it is necessary to apply a wrench to the wrench hold surface 29 at the head of each bolt 22 so as to back the bolt away from the bracket 27, thereby permitting the separative movement of the free marginal portions of the cover members 11 and 11a, which are enabled to have separative swinging movement by virtue of the flexible connection at 14. The connection at 14 has been described as preferably resilient, although it is to be appreciated that it need not be resilient and may be made of any suitably durable flexible material which will hold the parts together and yet will yield whenever swinging movement similar to the clam shell effect is desired. When the bolts 22 have been backed off to the desired extent, at the forward and rear end portions of the cover, the brackets 25 may be held by the hands in engagement with the bolt shoulders 23 so as to hold the free edges 19 of the cover members 11 and 11a apart to a sufficient extent to clear the laterally extending portions of the beading 10a on opposite sides of the well, so that the cover structure may be lifted past the beading 10a and up off the tire. When replacing the cover structure, the brackets 25 need not be held in engagement with the bolt shoulders 23 since, as the cover structure is shoved down into place, the beading 10a will cam the edges 19 of the cover members apart and allow the beading 20 to come to rest upon the fender 2, preparatory to the clamping of the bolts 22 and the resultant wedging of the free edges 19 and the beading 20 between the under portions of the beading 10a and the top of the fender 2. In the lowering and raising of the cover, the shanks of the bolts 22 may serve conveniently as handles.

It will be observed that the strips 9 and associated beading 10a do not extend transversely across the mouth of the well at the front and rear ends thereof. Rather, the beading 10a extends substantially only along the longitudinal sides of the well, so that the free marginal edges of the cover members 11 and 11a may be separated sufficiently to allow the same to pass down and up by the beading 10a.

With a view to holding the tire in firm engagement with the well and against rattling, the cover structure comprising the parts 11 and 11a is provided with a plurality of anti-rattling springs 30 preferably extending transversely so as to engage the tread of the tire 4 at transversely spaced points. The springs 30 are preferably welded as at 31 to the inner cover member 11a although riveting or other suitable connecting means may be employed. The free ends of the springs 30 are arranged so that they can be flexed with respect to the intermediate connected portions thereof. While any suitable circumferential series of springs may be employed, two such springs arranged substantially equidistant from the ends of the said covering portions are considered satisfactory, as shown.

The springs 30 are preferably so formed as to exert pressure upon the tread of a tire of the smallest diameter which may be employed in service on the automobile, the springs being yieldable in a generally radial direction to yieldably engage the treads of tires of greater diameter. When the cover structure is clamped in cooperative relation to the fender, the springs 30 exert pressure upon the tread of the enclosed tire, thereby substantially preventing rattling of the latter. It will be observed that the bottom 5 of the well is preferably transversely curved so as to engage the edges of the tread by a substantially wedge action to prevent relative lateral movement of the tire in the well. The springs 30 in the cover structure will have a similar effect, both as to movement of the tire transversely and in its own plane. When the cover structure is lowered over the tire, should the springs space the cover to such an extent as normally to prevent movement of the free edges 19 of the cover members under the beading 10a, the cover structure may be pressed downwardly, causing the springs 30 to yield sufficiently to allow said free edges 19 to enter under the beading 10a upon the tightening of the clamping bolts 22. For convenience, one of the bolts may be tightened first and then the other bolt may be tightened. The springs 30 thus serve not only to allow the cover structure to accommodate tires of different diameters without rattling but also assist in the proper cooperative relation between the lower marginal portions of the cover and the beading 10a. Thus, when it is desired to remove the cover structure and, to this end, the bolts 22 are backed off sufficiently to allow the free edges 19 to move upwardly past the beading 10a, such movement may be effected automatically by the springs 30 in their tendency to assume their normal shape. Thereafter the cover need merely be raised to remove it from the tire.

While either of the cover members 11 and 11a may be formed with the offset outer marginal flange 12, for purposes of appearance it is preferred that the outer cover member be so formed. The flange 12 thus does not appear from the outer side to be a raw or sharp edge. The flange 12, in addition to the function set forth hereinbefore, also functions as an ornamental and protective beading.

If desired, the flange portion 12 could be clinched about a cushion bead adapted for disposition between the cover members 11 and 11a to provide a weather-proof seal therebetween. Such a seal would preferably extend the full length of the overlapped portions of the cover members.

The beading at 10a and 20 provides a double weather-proofing seal as well as anti-rattling means.

It may be desired to equip the cover structure with a releasable theftproof locking means to prevent unauthorized removal of the cover structure. Such locking means may be of any conventional or other suitable construction, and may be provided in connection with any appropriate part of the cover structure or clamping mechanism. For example, the locking mechanism could be employed in conjunction with the swivel nut 26 and the shank of the bolt 22 in such a manner that the shank is prevented as by a latch or keeper projecting thereinto, from turning relative to the nut 26 when locked in place and is free to rotate therein when the locking mechanism is released. The locking mechanism is indicated at 32 in Figure 7 and may be provided with a key hole 33 for key operation.

If desired, a cotter pin, collar or other suitable means could be secured to the bolt shank and opposite to the shoulder 23 for engagement with the rear side of the bracket 25 to forcibly cause separative movement of the cover members 11 and 11a when the bolt is rotated in a direction to move the head away from the bracket 27.

The multi-part shell structure may be formed expeditiously and inexpensively substantially as follows:

A piece A of sheet material such as sheet metal is stamped out into a shallow pan shape with two spaced parallel adjacent ribs 17 projecting outwardly and preferably symmetrically arranged in respect to an axis of symmetry B of the piece. Such axis in the case of a substantially circular dished member would be a diameter. The dished member is then severed along such axis of symmetry, forming two substantially identical substantially semi-circular shell parts C and D, each having adjacent and in substantial parallelism to the severed edge a coextensive rib 17 bulged outwardly. The free arcuate margin along the rim of one shell member is offset radially outwardly, providing a rabbet for overlappingly receiving the corresponding edge of the other part. The cut edge of each part is curved outwardly and clinched about a cushion bead preferably substantially coextensive with the rib. The end portions of said edges on one of the shell members are removed so as not to interfere with the lapping of the members. Substantially halfway between the ends of the rim portions of the cover members, they are connected by a transversely extending flexible strap which permits the cover members to have relative hinging movement similar to a clam shell structure.

It will be observed that in following this method, duplicate stamping or like operations which would be necessary in the making of substantially identical half shell members is rendered unnecessary since, with substantially a single stamping or the like operation, followed by a cutting operation, the desired half members forming the clam shell tire cover structure may be fabricated.

The cover construction comprising the complemental cover parts 11 and 11a may be applied in the proper cooperative and interlocked relation to the beading 10a and the fender 2 irrespective of the presence or absence of the spare tire 4. This is true since the mounting of the cover structure is not dependent upon the tire. The cover structure may be firmly clamped in place in the absence of the tire, and thus the unattractive appearance of an uncovered well may be eliminated in the employment of the present invention.

Except for the heads of the clamping bolts and the brackets associated therewith which are relatively small in comparison with the sides of the cover structure, the only portions of the cover structure having the appearance of projections are the peripheral bead-like flange 12 and the beads 17 disposed substantially at the juncture of the cover and the fender. The remainder of the cover structure may be entirely smooth, and said portions 12 and 17 serve rather to enhance the appearance of the cover as a whole, and accordingly of the automobile equipped with such cover. While the drawings illustrate the cover embodying the invention applied to one of the front fenders, obviously a like cover may be applied at the other front fender or at the rear fenders or anywhere else on the car including the rear thereof.

When the cover structure is locked to the automobile at the mouth of the well, the spare wheel and tire are also locked to the automobile.

If it is desired to support the spare wheel as from an inner part thereof to a carrier projecting from the automobile, while a part of the spare tire is received in a well of the automobile, the cover could be so formed that its rear part is of arcuate shape so as to provide an opening of sufficient size to clear the carrier when the cover is shoved into and removed from proper tire covering position. Any type of wheel mounting under such conditions may be used, and if desired the wheel may be mounted by means of bolts such as the bolts used in mounting the wheel in service under the vehicle, such bolts passing into the holes 7a (Figure 2) provided for that purpose.

In the illustrated embodiment of the invention, the connection between the cover and the well is such that the cover is on the outside. If desired, by a simple reversal of the portions 10, 10a, and 17, the portions 17 could be fitted on the inside of the straps 9, and the clamping means constructed and operated so as to exert a spreading force on the members 11 and 11a so as to cause such reversed ribs 17 to be forcibly engaged with such reversed beading 10a. In such event, the beading 20 could be dispensed with if so desired. Suitable provision would be made at the overlapping portions of the members 11 and 11a to take care of the relative movement necessary for such a reversed construction.

It will be appreciated that the members 11 and 11a could be formed in arcuate shape for covering portions of the tire only, the clamping means in such event operating as described above, the retaining means at the well in such event being correspondingly shortened.

If so desired, the clamping mechanism could be mounted on the fender and engageable with the cover members 11 and 11a to adjust them toward and away from each other into and out of clamped telescoped engagement with the well beading 10a.

In accordance with the invention the beads mounted at the fender could be made movable away from and toward each other and the cooperating means of the cover relatively fixed, the clamping means being constructed and arranged to move such beading into and out of engagement with such cooperating means when the cover is disposed over the fender. The cover parts 11 and 11a in such event could be fastened together rigidly. The beads could be inherently springable into interlocked relation with the cover as the latter is shoved down and require manual retraction by means accessible from the outside of the cover before removal of the cover could be eected, or such beads could be cammed into retracted position by forcible raising of the cover.

In all such alternative forms releasable theft-proof locking means, key or otherwise controlled, may be employed as explained above.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The combination of, a fender, a well in said fender for receiving a spare tire, said well having ledges outwardly directed at each side thereof and spaced above said fender, a cover for covering the exposed part of a tire located in said well, including surfaces at each side of said well secured for movement toward and from said ledges, each of said surfaces having terminal portions movable under said ledges and into the space between said ledges and fender, means on said portions for engaging the fender, means on said ledges for engaging said portions and means to force said surfaces together and toward the sides of said well to force said engagement of said first two means whereby said portions are gripped between the ledges and fender through said first two means for securing the cover to the well.

2. The combination of, a fender, a well in said fender for receiving a spare tire, said well having ledges outwardly directed at each side thereof and spaced above said fender, a cover for covering the exposed part of a tire located in said well, including surfaces at each side of said well secured for movement toward and from said ledges, each of said surfaces having terminal portions movable under said ledges and into the space between said ledges and fender, resilient means on said portions for engaging the fender, resilient means on said ledges for engaging said portions and means to force said surfaces together and toward the sides of said well to force said engagement of said resilient means whereby said portions are gripped between the ledges and fender through said resilient means for securing the cover to the well and whereby, upon withdrawal of said force means, the inherent tendency of said resilient means to return to their normal conditions will relieve said grip, said cover including two vertical halves held together by said forcing means.

3. The combination of a well for receiving a spare tire, said well having ledges projecting therefrom and at each side thereof, a cover for covering the exposed part of a tire located in said well, including surfaces at each side of said well secured for movement toward and from said ledges, each of said surfaces having terminal portions movable under said ledges for retaining cooperation therewith, resilient means on said ledges for engaging said portions, and means to force said surfaces together and toward the sides of said well to force said engagement of said resilient means whereby said portions grippingly engage said ledges through said resilient means for securing the cover to the well, and whereby upon withdrawal of said force means the inherent tendency of said resilient means to return to its normal condition will relieve said grip, said cover including means bearing against the tire to assist in holding said cover terminal portions in proper cooperative relation with said well ledges.

GEORGE ALBERT LYON.